May 1, 1951 J. B. GOODGAME 2,551,210
SPINDLE AND BOBBIN SHAFT MOUNTING FOR ROVING FRAMES
Filed Nov. 6, 1950 2 Sheets-Sheet 1
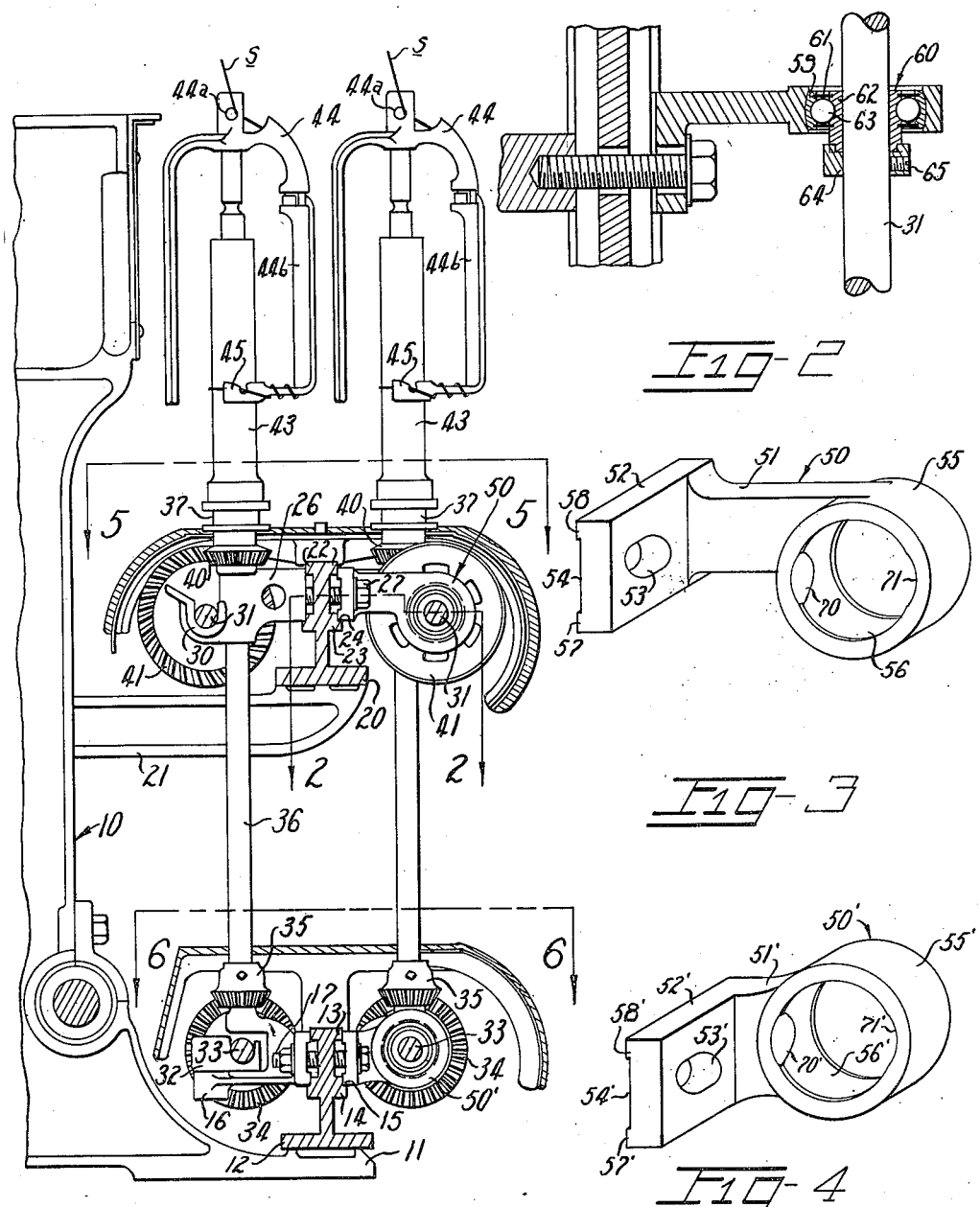
INVENTOR:
JESSE B. GOODGAME.
BY Eaton + Bell
ATTORNEYS

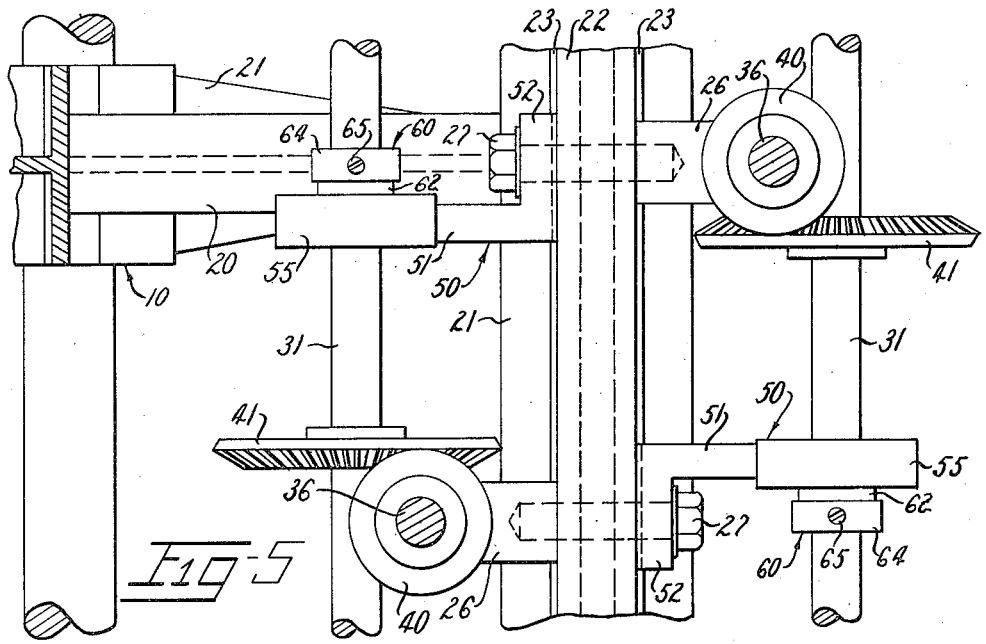
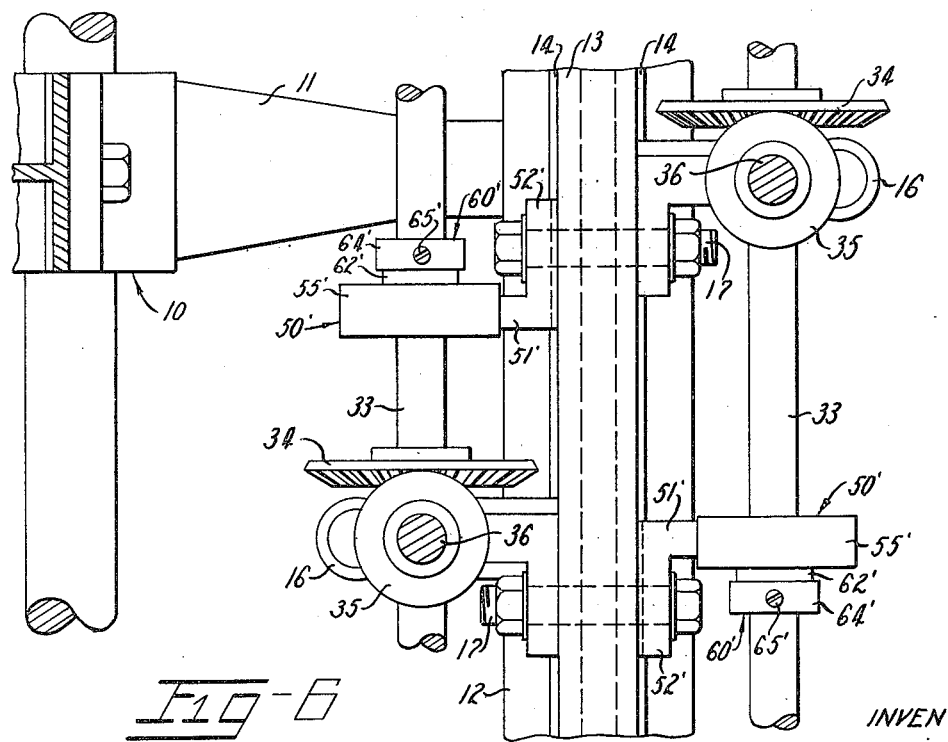

Patented May 1, 1951

2,551,210

UNITED STATES PATENT OFFICE 2,551,210

SPINDLE AND BOBBIN SHAFT MOUNTING FOR ROVING FRAMES

Jesse B. Goodgame, Charlotte, N. C., assignor to Precision Gear and Machine Co. Inc., Charlotte, N. C., a corporation of North Carolina Application November 6, 1950, Serial No. 194,264

7 Claims. (Cl. 57—102)

This invention relates to textile machinery and more especially to an improved mounting for the bobbin or bolster shafts and the spindle or step shafts of roving frames and the like.

As is well known to those familiar with the art, the bobbin and spindle shafts of roving frames transmit rotation to the bobbins or bolsters and spindles thereof through an arrangement of beveled gears and, heretofore, these shafts have been mounted in U-shaped or hook-shaped bearings which, upon becoming worn would result in the gears not meshing properly which would result in the gears wearing out far in advance of their normal useful life.

It is therefore an object of this invention to provide an improved means for supporting the bobbin shafts and spindle shafts comprising a housing or bearing block which may be mounted on the corresponding bobbin or spindle rails by bolting the same to the corresponding rails by utilization of the same holes in which the hook-shaped bearings have heretofore been secured to the corresponding rails. Each of these bearing blocks is provided with a self-alining ball bearing in which the corresponding shaft is mounted and, these bearings are sealed to obviate the necessity of lubricating the bearings and to insure that the axes of the shafts will remain in constant relation to the corresponding rails so the gears for driving the bobbin and spindle rails will remain properly enmeshed. It is evident that this will also eliminate the necessity of frequently replacing the bearings, as has heretofore been the case in using the hook type of bearing.

Some of the objects of the invention having been stated, other objects will appear as the description proceeds when taken in connection with the accompanying drawings in which—

Figure 1 is a transverse vertical sectional view through a portion of a roving or spinning frame showing the improved means for supporting the spindle shaft and bobbin shafts thereof;

Figure 2 is an enlarged fragmentary sectional plan view taken substantially along the line 2—2 in Figure 1;

Figure 3 is an enlarged isometric view of the improved bearing member which is employed in supporting the bobbin shaft of the roving frame with the ball bearing unit removed therefrom;

Figure 4 is a view similar to Figure 3 but showing the bearing housing or member for supporting the spindle shafts of the roving frame;

Figure 5 is an enlarged fragmentary plan view taken substantially along the line 5—5 in Figure 1 and showing particularly the manner in which the improved bearing members may be secured to the corresponding bolster rail in opposite relation to the usual spindle bearings;

Figure 6 is a view similar to Figure 5, being taken substantially along the line 6—6 in Figure 1, and showing the manner in which the improved bearing members may be secured to the spindle rail in opposite relation to the usual spindle support brackets.

Referring more specifically to the drawings, the numeral 10 broadly designates the frame of a roving machine of a type such as is manufactured by Saco-Lowell Company of Providence, Rhode a vertically spaced longitudinally extending portions 11 at the lower end thereof (Figure 1), there being only one of these portions 11 shown in the drawings. These portions 11 support a conventional stationary spindle rail 12 which has a vertically spaced longitudinally extending upper and lower projections 13 and 14, on opposed sides thereof, the lower projections 14 being cut away, as at 15, throughout their length for normally supporting the lower edges of spindle rail support bearing blocks or members 16 which are spaced throughout the length of the spindle or step rail 12 with the spindle support members 16 at opposed sides of the rail 12 being disposed in staggered or off-set relation to each other as is clearly shown in Figure 6. Each of the bearing members 16 is secured to the corresponding spindle or step rail 12 by a bolt 17 which slidably penetrates the rail 12 intermediate the upper and lower projections 13 and 14 thereon.

Spaced substantially above the spindle or step rail 12 is a substantially inverted T-shaped bolster or bobbin rail 20 which is supported for vertical movement on a plurality of horizontally spaced arms 21 which are controlled as to vertical movement by a conventional builder motion, not shown.

The bolster rail 20, like the spindle rail 12 also has longitudinally extending upper and lower projections 22 and 23, respectively, on opposed sides thereof, the lower projections 23 each being cut away as at 24 for supporting the lower edges of conventional spindle bearings or bolster support bearings 26 which are each secured to the corresponding longitudinally extending projections 22 and 23 of the bolster rail 20 by a screw 27. These bolster support members 26 are disposed in alinement with the spindle support members 16 disposed therebelow and are also positioned in staggered spaced relation to each other throughout the length of the bolster rail as is clearly shown in Figure 5. Certain of the spindle bearing members 26 have a conventional hook bobbin shaft bearing portion 30 integral therewith in which a conventional longitudinally extending bobbin or bolster drive shaft 31 rests and is supported for rotational movement, there being two of these bobbin drive shafts 31 shown in the drawings, one on each side of the bolster rail 20.

Each of the spindle support members 16 also has a suitable spindle drive shaft bearing member 32 secured thereto which is also substantially U-shaped for the reception of a corresponding longitudinally extending spindle drive shaft 33, there being two of these spindle drive shafts 33 shown in the drawings. Each of these spindle drive shafts 33 has a plurality of spaced beveled gears 34 fixedly mounted thereon, there being one of these gears 34 disposed adjacent each of the spindle support members 16. Each of the gears 34 meshes with a relatively smaller beveled gear 35 fixedly mounted on a corresponding spindle 36 which extends upwardly and slidably and rotatably penetrates the corresponding bolster support or spindle bearing member 26.

Each of the bolster support members 26 has a conventional bolster 37 resting thereon which is supported for rotation thereon and which has a beveled gear 40 integral therewith. Each of the beveled gears 40 meshes with a corresponding beveled gear 41 fixed on the corresponding bolster or bobbin drive shaft 31, there being one gear 41 disposed adjacent each of the bolster support members 26.

Each of the bolsters 37 supports a bobbin 43 and each of the bolsters 37 and the bobbins 43 are slidably penetrated by the corresponding spindle 36 which extends substantially above the upper end of the bobbin 43 as is clearly shown in Figure 1. It is evident that the bolster 37 is keyed in the usual manner on the corresponding spindle 36 so as to rotate therewith.

The upper end of each of the spindles 36 has a usual type of flyer 44 fixed thereon which is provided with an opening 44a at the upper end thereof through which a roving of yarn S is directed from the usual source, not shown. The roving of yarn S then passes through the tubular leg 44b of the flyer 44 and extends from the lower end of said leg and is wrapped a few turns about a presser foot 45 which directs the roving of yarn S from the flyer onto the bobbin 43. The gearing shown in Figure 1 is such that the flyer 44 rotates with the right-hand portion thereof in Figure 1 moving away from the observer or clockwise and the bobbin 43 also rotates in the same direction but at a relatively slower speed to assist in twisting the roving of yarn S and also in laying the roving onto the bobbin 43. The parts heretofore described are the usual parts of a roving frame and it is with these parts that the present invention is adapted to be associated.

Referring to Figures 1, 2 and 5, there is shown an improved mounting for the bobbin drive shaft for each of the bobbin drive shafts 31, the mounting being represented by bearing blocks broadly designated at 50. A plurality of bearing blocks 50 are provided and are preferably disposed opposite each of the bolster supports 26 on the bolster rail 20. Each bearing block 50 includes a stem portion 51, a foot portion 52 and an enlarged circular or annular portion 55 at the end remote from the foot portion 52. The foot portion 52 is provided with a slot 53 which may be penetrated by the corresponding screw 27 for securing the same to the corresponding projections 22 and 23 on the bolster rail 20. The foot 52 of the bearing block 50 has a groove 54 therein defining shoulders 57 and 58 adapted to fit against the projections 22 and 23 on the bolster rail 20.

Since the spindle drive shafts 33 are supported in substantially the same manner in which the bolster or bobbin drive shafts 31 are supported, the bearing blocks for supporting each of the spindle drive shafts 33 will bear the same reference characters as those characters applied to the bearing blocks 50 in Figure 3 but with the prime notation added, one of the bearing blocks employed in supporting the spindle drive shaft being shown removed from the machine in Figure 4.

It is preferable that the lower edge of foot 52 on each of the bearing blocks 50 be machined accurately relative to the slot 53 so as to be positioned in and supported by the cut away portion 24 in the corresponding projection 23 on the bolster rail 20.

It is evident that the bearing members 50' would be secured to the corresponding projections 13 and 14 on the spindle rail 12 in the identical manner in which the bearing members 50 are secured to the bolster rail 20, and the slots 51' are penetrated by the respective bolts 17 for securing the bearing members 50' to the spindle rail 12.

It will be noted that, due to the fact that the spindles 36 are disposed in staggered relation to each other throughout the length of the spindle rail 12 and the bolster rail 20, the screw 27 and the bolt 17, which normally secure the respective bolster support member 26 and the spindle support member 16 to the respective rails 20 and 12, are also employed in securing the respective bearing blocks 50 and 50' to the rails 20 and 12. This obviates the necessity of drilling additional holes in the rails 12 and 20 for securing the respective bearing members 50 and 50' thereto.

Each of the bearing blocks 50 has an enlarged substantially circular portion 55 integral with the stem 51 thereof and which has an opening 56 therethrough, the wall of the opening being concave for the reception of the convex outer race 59 of a self-aligning ball bearing designated broadly at 60 (Figure 2). The self-aligning ball bearing is provided with lubricant seals 61 at opposed sides thereof which retain a suitable lubricant, not shown, between the outer race 59 and an inner race 62 which are held in spaced relation to each other by balls 63. It will be observed in Figure 2 that the inner race of the self-aligning ball bearing 60 is substantially longer than the outer race thereof and has a collar 64 suitably held thereto which is penetrated by a set screw 65 for securing the collar and the inner race 62 to the corresponding shaft 31. The circular potrion 55 of the bearing block 50 is provided with bearing insertion recesses 70 and 71 to permit insertion of the bearings 60 therein.

Bearings 60' identical to the bearings 60 are fitted in each of the bearing blocks 50' for supporting the spindle shafts 33.

It is thus seen that I have provided an improved means for rotatably supporting the bolster drive shafts 31 and the spindle drive shafts 33 which eliminates the necessity of lubricating the bearings and also gives greater life to the corresponding gears 40, 41 and 34, 35 when the shafts 31 and 33 are supported in the self-aligning bearings 60 and 60' than is possible when the shafts 31 and 33 are only supported in the U-shaped type of bearing such as the projections 30 on the members 26 and the bearing blocks 32 on the members 16.

It might be stated that although the improved bearing members 50 and 50' are added to the machine, it is not necessary to remove or replace the original bearings for the shafts 31 and 33 since the bearing members 50 and 51 are mounted between the spindles 36.

In the drawings and specification, there has been set forth a preferred embodiment of the invention and although specific terms are employed, they are used in a generic and descriptive sense only and not for purposes of limitation, the scope of the invention being defined in the claims.

I claim:

1. In a roving frame and the like having a spindle rail and a bolster rail, said roving frame also having spindles and bolsters and being provided with spindle shafts disposed adjacent the spindle rail for driving said spindles and bolster shafts adjacent the bolster rail for driving said bolsters, and said bolster rail and said spindle rail having respective bolster and spindle supports thereon, said bolster shafts and said spindle shafts being rotatably mounted in the respective bolster and spindle supports, an improved mounting for the bolster shafts and spindle shafts comprising a plurality of bearing blocks secured to the bolster rails and spindle rails and each of said bearing blocks having a ball bearing therein, said ball bearings having the respective spindle shafts and bolster shafts rotatably mounted therein.

2. In a roving frame and the like having a bolster rail and a spindle rail and being provided with at least a pair of bolster shafts disposed one on each side of said bolster rail and at least a pair of spindle shafts disposed one on each side of said spindle rail, improved means for supporting said bolster shafts and said spindle shafts for rotation comprising a plurality of bearing blocks secured on the opposed sides of said bolster rail in staggered relation to each other, each of said bearing blocks having an anti-friction bearing therein penetrated by said bolster shafts and serving to support said bolster shafts for rotation therein, a second plurality of bearing blocks secured to the opposed sides of said spindle rail in staggered relation to each other, and each of said last-named bearing blocks being provided with an anti-friction bearing therein penetrated by said spindle shafts and serving to support said spindle shafts for rotation therein.

3. In a yarn processing machine having a frame and also having a plurality of vertically disposed spindles and also having at least one driven shaft and mechanical connections between the driven shaft and the spindles for transmitting rotation to the spindles, improved means for rotatably supporting the shaft comprising a plurality of bearing blocks each having a stem portion, a foot portion and an enlarged outer portion, a self-alining ball bearing mounted in the outer portion of each bearing block and means securing the foot portion of each bearing block to the frame.

4. In a roving frame, spinning frame and the like having spindle rails and bolster rails, each of said spindle rails and bolster rails being provided with spindle support brackets and bolster support brackets respectively, and said roving frame also having a pair of bolster shafts rotatably supported by said bolster support brackets and a pair of spindle shafts rotatably supported by said spindle support brackets, an improved bearing for said bolster shafts and spindle shafts comprising a plurality of bearing blocks adapted to be secured to the respective bolster rails and spindle rails and each having a foot portion and a body portion integral with said foot portion and having an annular member on the end thereof, said annular member having a concave inner surface, a self-alining ball bearing removably mounted in said annular member, whereby said spindle shafts and bolster shafts may be rotatably mounted in said ball bearings mounted on the respective bolster and spindle rails.

5. In a roving frame and the like having a bolster rail mounted thereon, said bolster rail having a plurality of bolster support brackets secured to the opposed sides thereof in staggered relation to each other, and a pair of bolster drive shafts positioned one on each side of said bolster rail and supported for rotation in said bolster support brackets, an improved means for supporting said bolster drive shafts for rotation in synchronization with each other comprising a plurality of bearing blocks secured to the opposed sides of said bolster rail in staggered relation to each other, each of said bearing blocks being positioned on said rail opposite the respective bolster support brackets, each of said bearing blocks having a self-alining ball bearing therein and said bolster shafts being rotatably mounted in said self-alining ball bearings.

6. In a roving frame and the like having at least one horizontally disposed rail thereon and also having a plurality of vertically disposed spindles extending adjacent the rails and also having means on the rail for supporting said spindles for rotation and also having at least one horizontally disposed driven shaft extending past the spindles and said spindles and said shaft having mating gears thereon for transmitting rotation from the driven shaft to the spindles, an improved mounting for the shaft comprising a plurality of spaced bearing blocks secured to the rail and an annular self-alining bearing mounted in each of the bearing blocks and in which the shaft is mounted, whereby the annular bearing will insure that the displacement between the gears on the shaft and the spindles will remain constant with continued rotation of the shaft to thereby prevent the gears from wearing unduly as a result of being improperly enmeshed.

7. In a roving frame having at least one horizontally disposed rail thereon and also having at least one vertically disposed spindle and also having means on the rail for supporting the spindle for rotation and also having at least one horizontally disposed driven shaft extending adjacent the rail and also having at least one gear on the driven shaft and a mating gear on the spindle meshing with the gear on the shaft, an improved means for supporting said shaft for rotation comprising a plurality of bearing blocks, each having a stem portion, a foot portion and an enlarged outer portion, a self-alining anti-friction bearing mounted in the enlarged outer portion and in which the shaft is mounted for rotation, said roving frame also having means for securing the means which supports the spindle for rotation to the rail and said last-named means also penetrating the foot of the corresponding bearing block to secure the same to the rail to thereby obviate the necessity of drilling special holes in the rail for supporting said bearing block and whereby said improved mounting will insure that the gears on the spindle and the shaft will always be properly enmeshed.

JESSE B. GOODGAME.

No references cited.